Feb. 7, 1956 E. F. CAHOON ET AL 2,734,099
TELESCRIBER
Original Filed Sept. 20, 1950 9 Sheets-Sheet 1
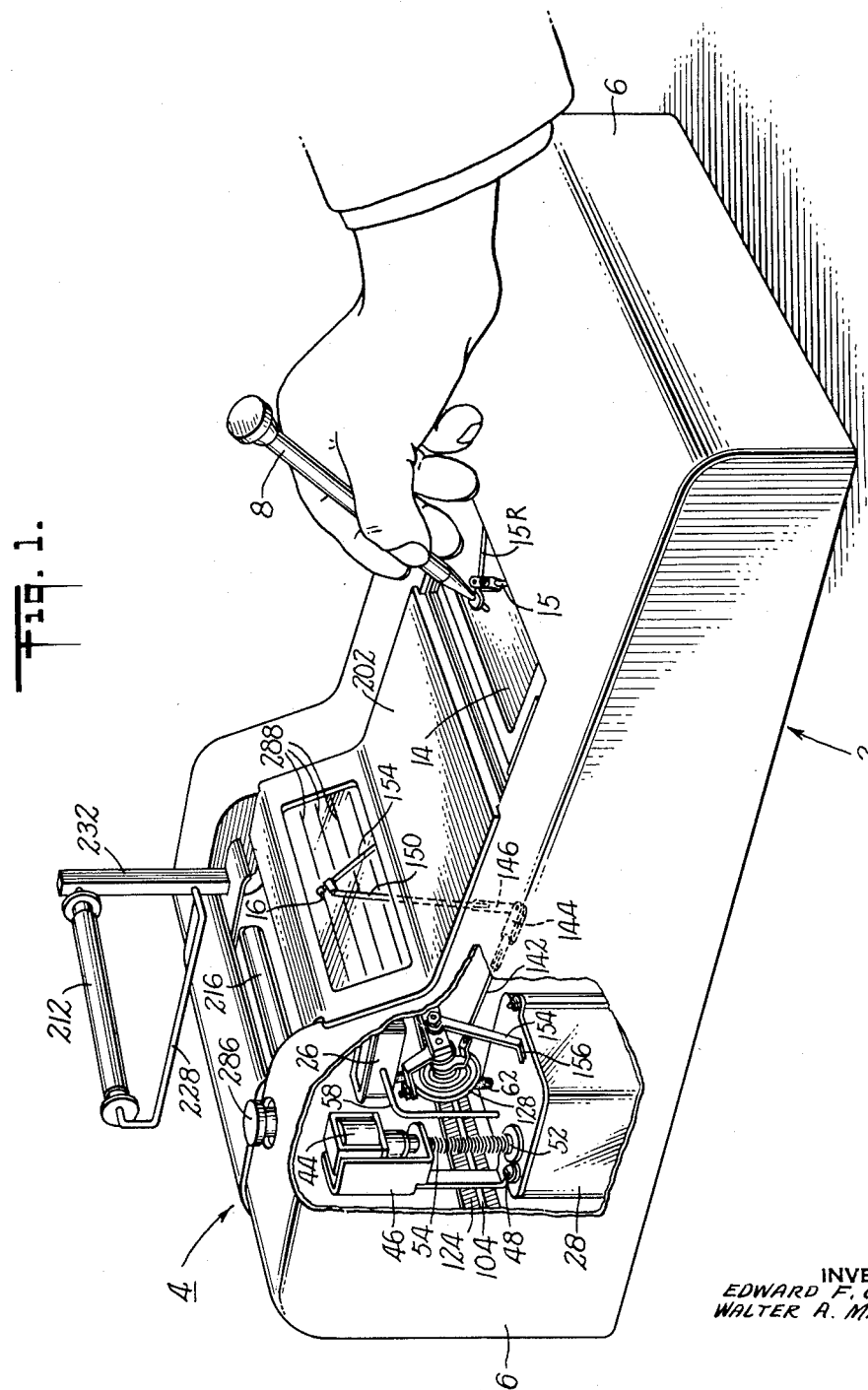
INVENTORS
EDWARD F. CAHOON &
WALTER A. MACDONALD

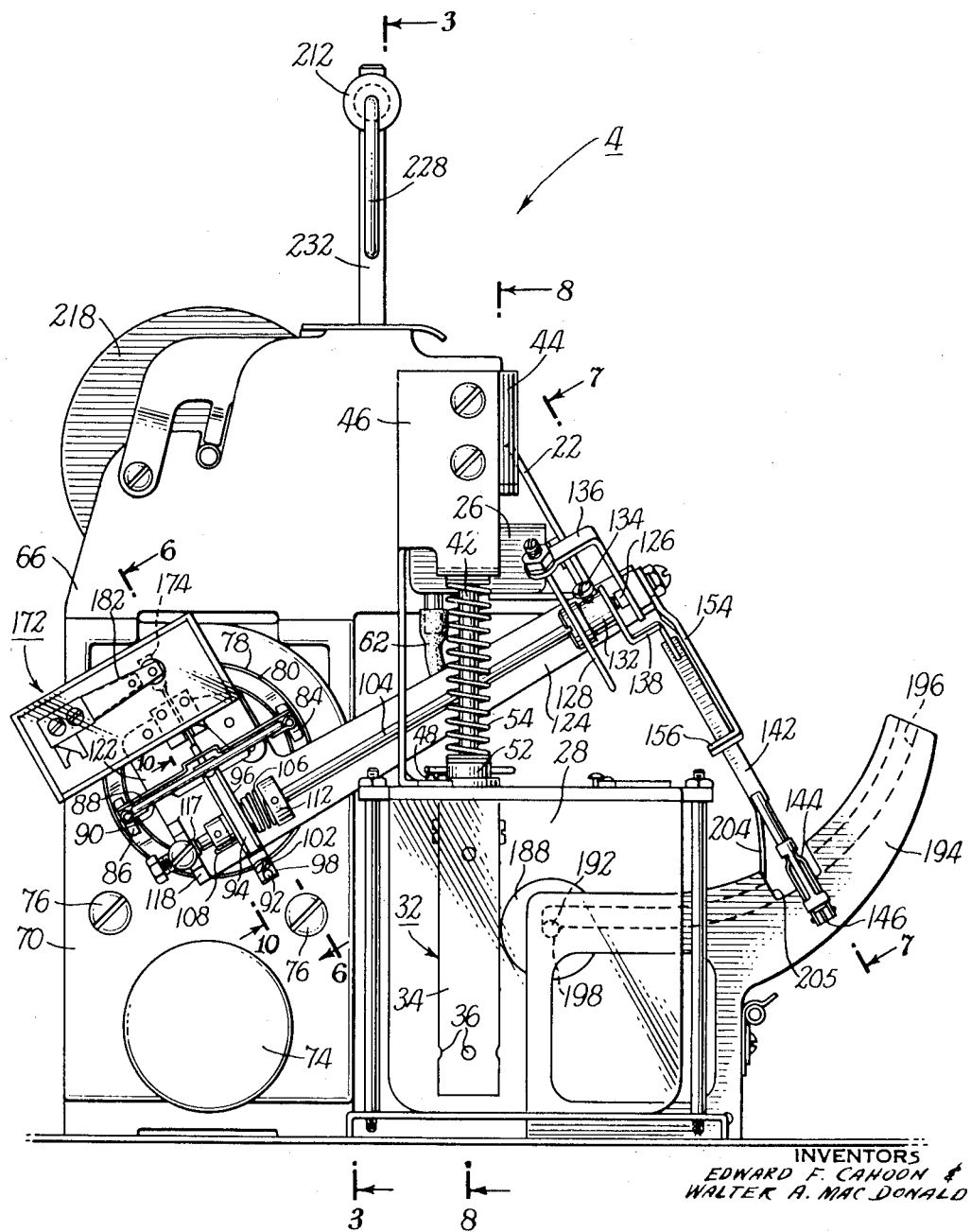

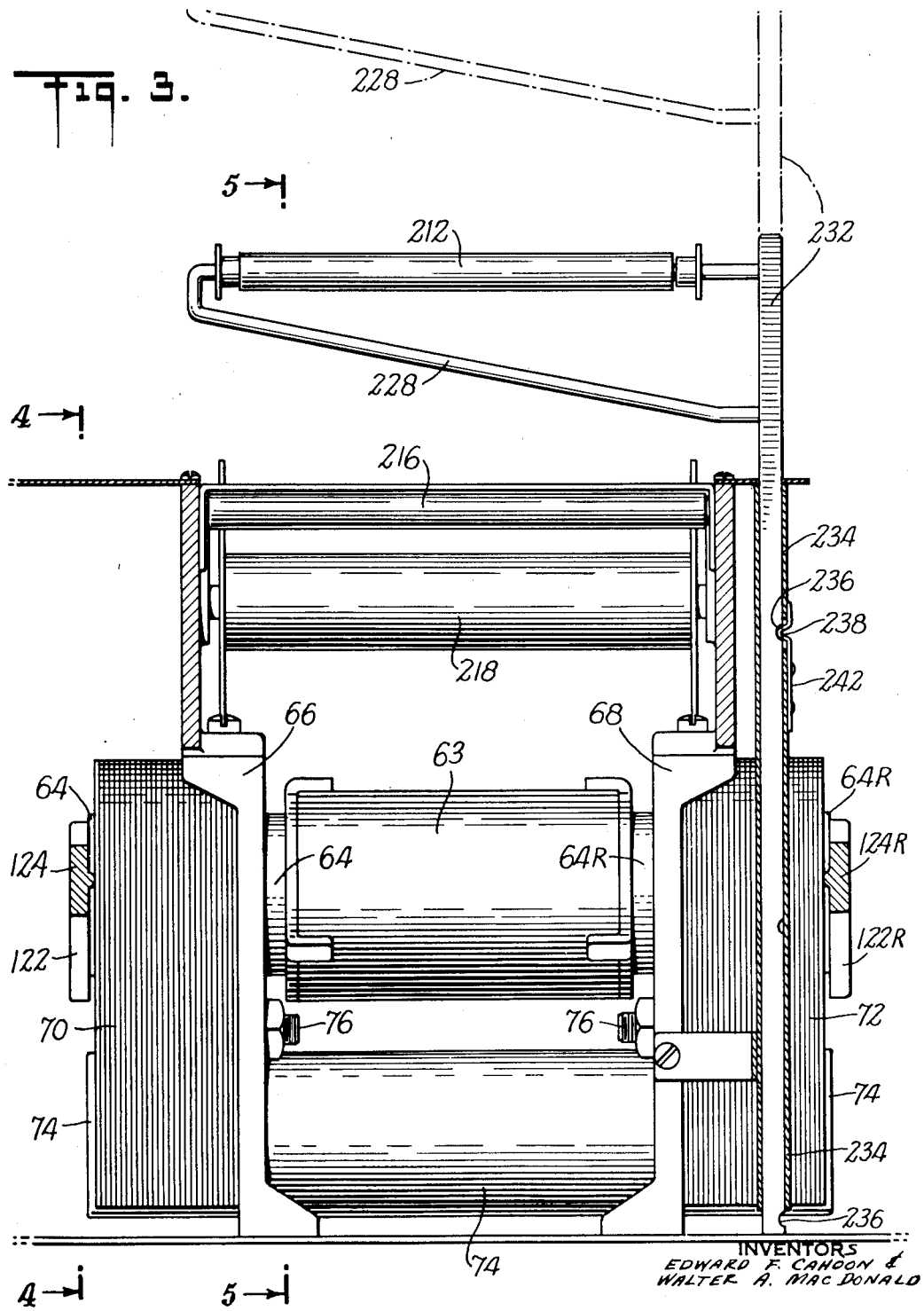

Feb. 7, 1956 E. F. CAHOON ET AL 2,734,099
TELESCRIBER
Original Filed Sept. 20, 1950 9 Sheets-Sheet 4
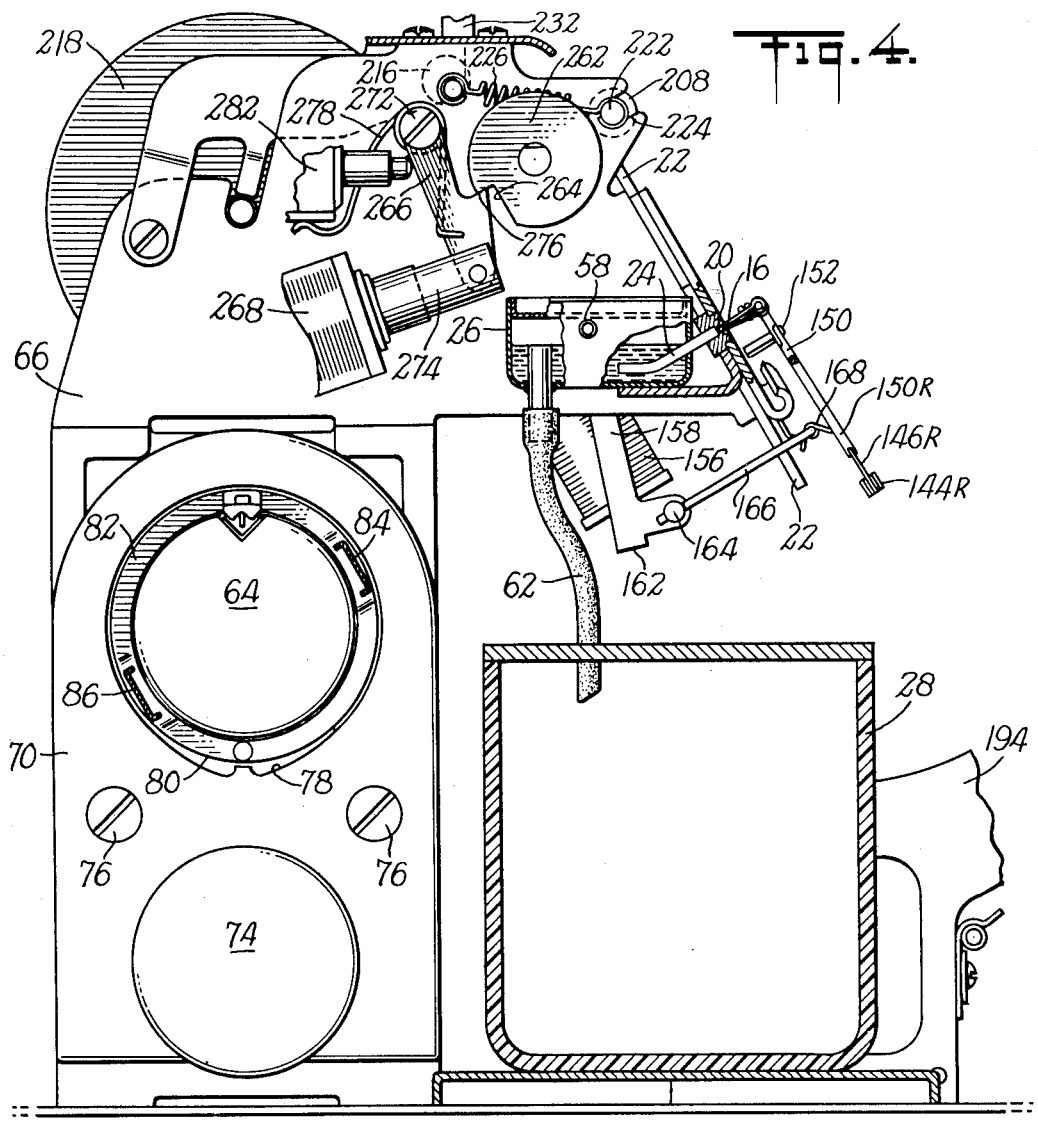
INVENTORS
EDWARD F. CAHOON &
WALTER A. MACDONALD

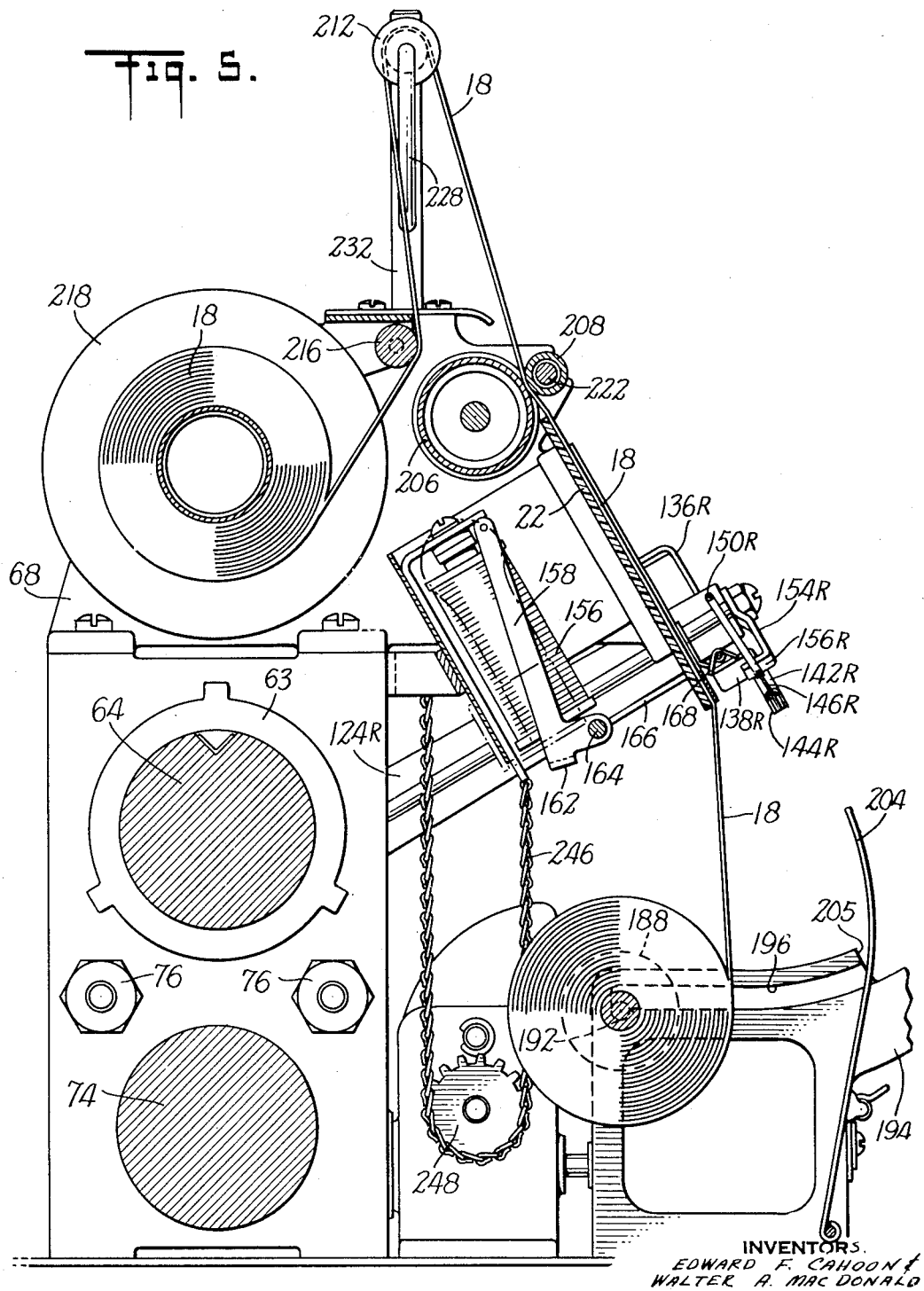

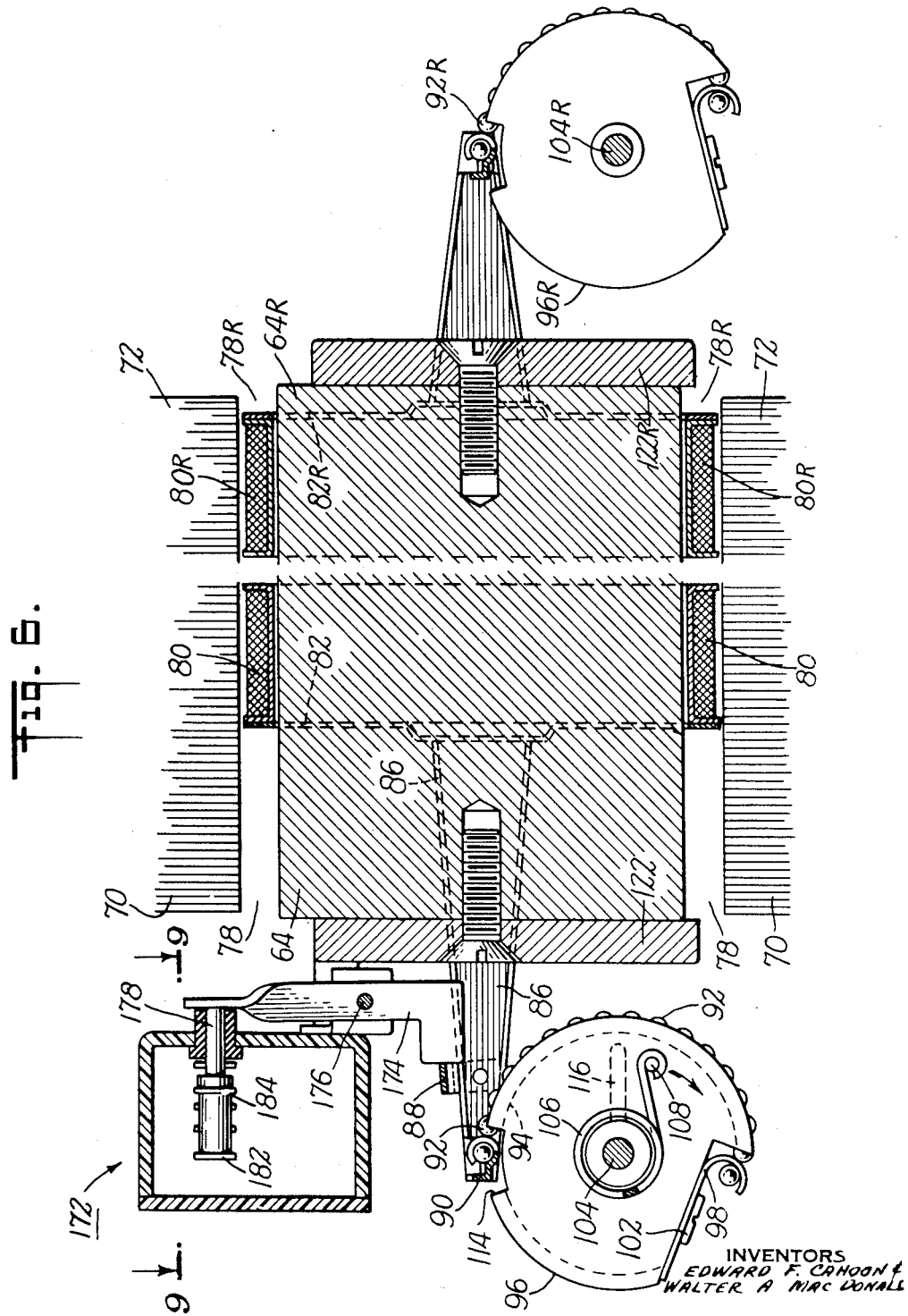

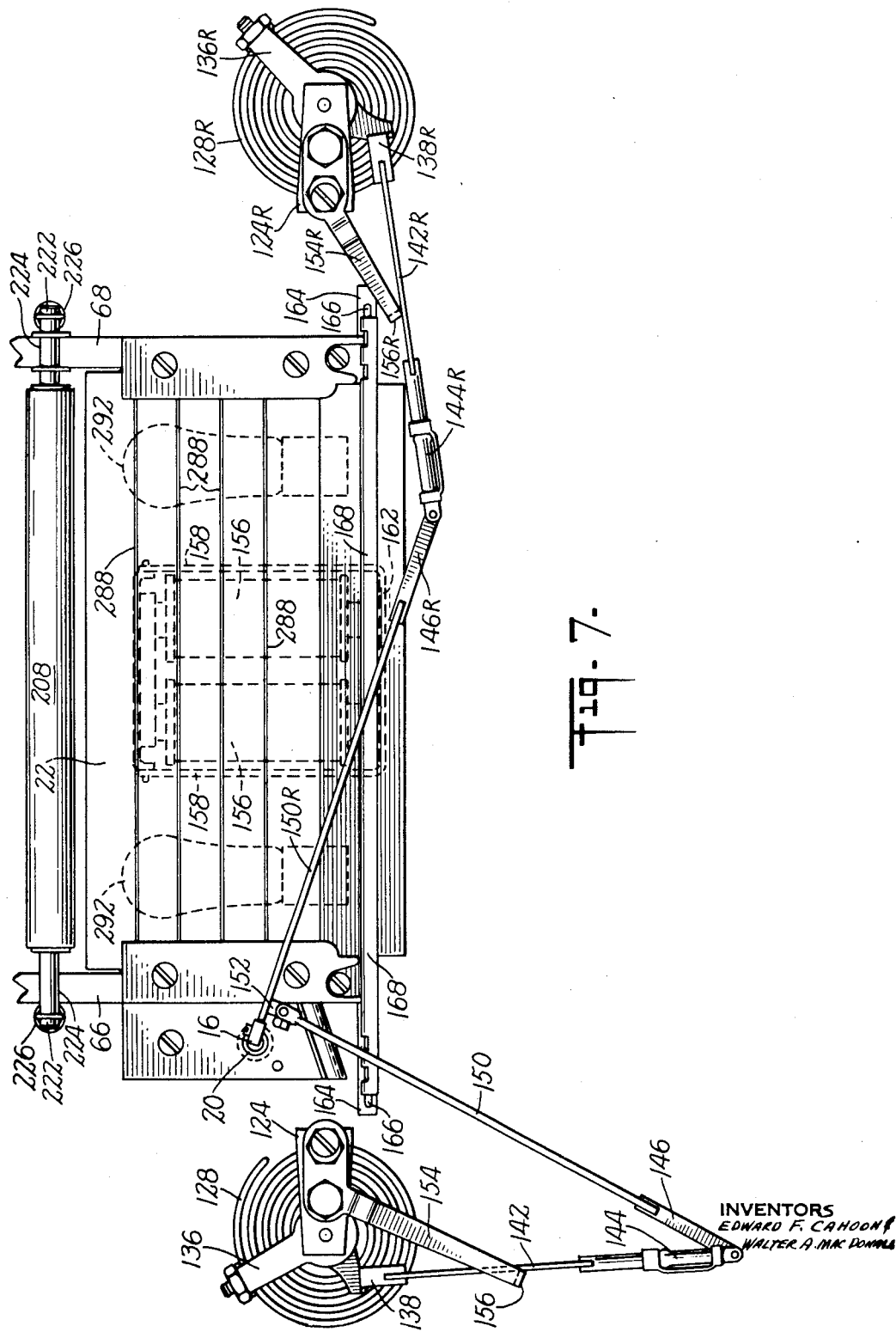

Feb. 7, 1956 E. F. CAHOON ET AL 2,734,099
TELESCRIBER
Original Filed Sept. 20, 1950 9 Sheets-Sheet 8
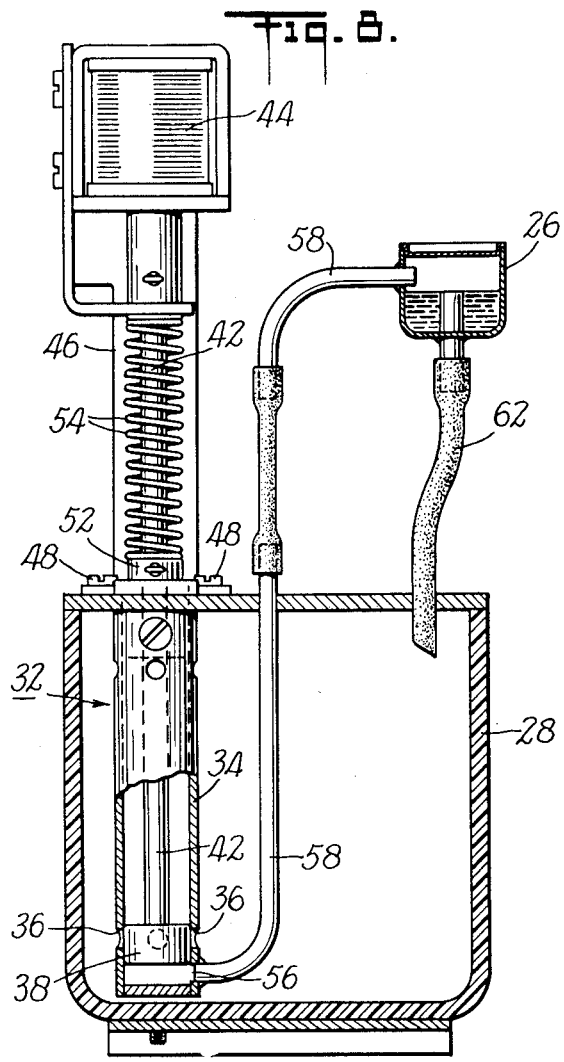
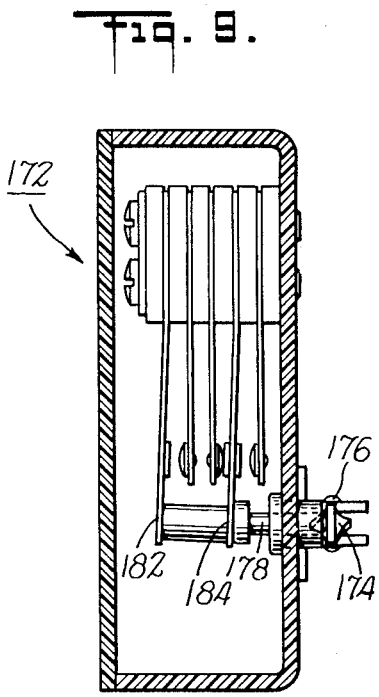
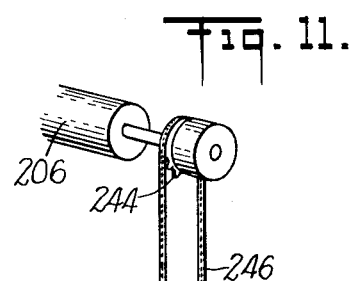
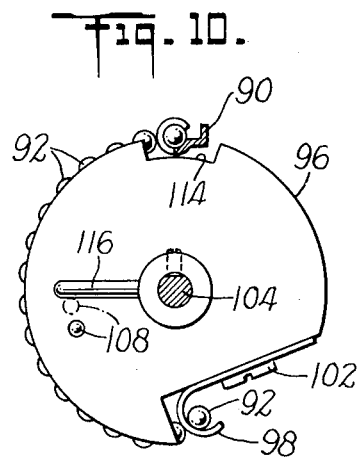
INVENTORS
EDWARD F. CAHOON &
WALTER A. MACDONALD Feb. 7, 1956  E. F. CAHOON ET AL  2,734,099
TELESCRIBER Original Filed Sept. 20, 1950  9 Sheets-Sheet 9

INVENTORS
EDWARD F. CAHOON &
WALTER A. MACDONALD

United States Patent Office 2,734,099
Patented Feb. 7, 1956

2,734,099

TELESCRIBER

Edward F. Cahoon, West Nyack, and Walter A. MacDonald, New York, N. Y., assignors to Telautograph Corporation, New York, N. Y.

Original application September 20, 1950, Serial No. 185,872, now Patent No. 2,711,442, dated June 21, 1955. Divided and this application November 13, 1952, Serial No. 330,232

9 Claims. (Cl. 178—19)

This invention relates to telescribers for the transmission of graphic characters from one location to another. More particularly, the invention is directed to the simplification and improvement of the telescriber structure. This application is a division of application Serial No. 185,872, filed September 20, 1950, now U. S. Patent No. 2,711,442 dated June 21, 1955.

In telescriber systems of this type, two writing signals are transmitted corresponding, respectively, to two coordinates defining the position of the writing stylus in a plane parallel to the writing surface. A third "on-off" signal is transmitted to indicate whether the writing stylus is in contact with or lifted above the writing surface, so that discontinuous traces can be transmitted. Two additional signals also are provided, one for shifting the paper at the receiver and another for controlling a signal buzzer. In the present system, an automatic switch is provided at the receiver which permits the transmission lines connecting the transmitter and receiver to be used for signaling, paper-shifting, or other functions when writing signals are not being transmitted, but switches the circuits for the reception of writing signals whenever such signals are present on the incoming lines.

One difficulty with earlier type machines was that the ink supply reservoir was relatively small so that it was necessary for the operator occasionally to replenish the ink supply. Such an arrangement is undesirable, not only because of the nuisance of replacing the ink supply, but because the operator is frequently unfamiliar with the operating mechanism of the receiver and ink is sometimes spilled on moving parts of the equipment interfering with its proper operation. In the present system, a large ink reservoir is provided which holds a sufficient quantity of ink that the operator ordinarily is not required to replenish the ink supply, this being done by a service mechanic who periodically services the machine. A pump is provided which automatically pumps the ink from the reserve reservoir to a smaller ink tank that feeds the recording pen.

Other aspects, objects, and advantages of the invention, for example, relating to the paper handling apparatus, will be in part pointed out in, and in part apparent from, the following description of a telescriber transceiver embodying the invention considered in connection with the accompanying drawings, in which:

Figure 1 is a perspective view of a telescriber transceiver for the transmission and reception of graphic characters, part of the case being cut away to show the arrangement of certain parts;

Figure 2 is an end view of the receiver portion of the transceiver with the case removed;

Figure 3 is a sectional view taken along line 3—3 of Figure 2;

Figure 4 is a sectional view taken along line 4—4 of Figure 3;

Figure 5 is a sectional view taken along line 5—5 of Figure 3;

Figure 6 is an enlarged sectional view, with the center portion deleted, taken along line 6—6 of Figure 2;

Figure 7 is an enlarged sectional view taken along line 7—7 of Figure 6;

Figure 8 is an enlarged sectional view taken along line 8—8 of Figure 2;

Figure 9 is a sectional view taken along line 9—9 of Figure 6;

Figure 10 is an enlarged sectional view along line 10—10 of Figure 2;

Figure 11 is a perspective view of a portion of the paper shifter mechanism.

Figure 12:
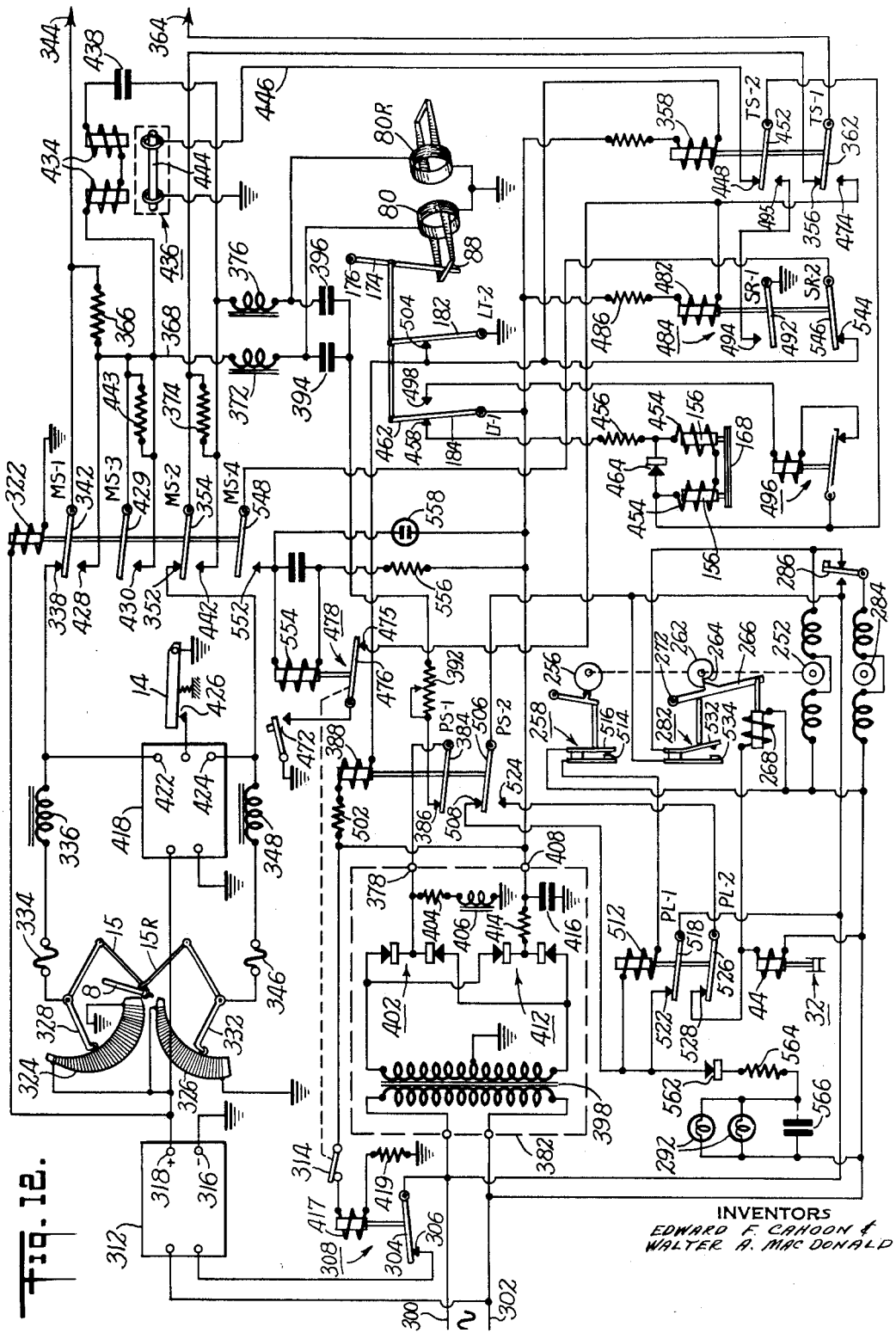
Figure 12 is a schematic diagram of the electrical circuits of the transceiver shown in the above drawings.

Figure 1 shows a combination transmitter and receiver, called a transceiver, for the transmission of graphical characters from one point to another. The transmitting portion of the transceiver is positioned near the front of the machine in the space, generally indicated at 2, and the receiving apparatus is positioned near the rear of the machine, in the space generally indicated at 4. The entire machine is housed in a case 6 of metal or plastic which is provided with the necessary openings or doors to permit convenient access to the operating parts of the transceiver.

This transceiver can be connected to one or more other transceivers or receivers positioned at distant points. The characters to be transmitted are traced with a stylus 8, which is free to move over the upper surface of a platen 14. The stylus 8 is connected by linkage members 15 and 15R which control the signal generating portion of the transmitter in accordance with the position of the stylus 8 on the platen 14. At a distant receiver, these signals effect the reproduction of the graphic characters traced by the stylus 8. When signals are being transmitted to a distant receiver, the local receiver 4 operates as a monitor so that the operator can see exactly what is being reproduced at the distant receiver. This reproduction is accomplished by a recording pen 16 which reproduces the transmitted characters on a strip of paper 18, which is shown in Figure 5, but which has been omitted from the showing of Figure 1 in order to better illustrate certain parts of the transceiver.

The stylus 8 is connected by the linkage mechanism 15 and 15R to a pair of potentiometers (shown only in the schematic diagram of Figure 12) by means of which two writing-signal voltages are produced in accordance with the position of the stylus 8 on the platen 14. These potentiometers and the stylus linkage mechanism are similar to those described by Tiffany in U. S. Patent 1,770,761. The recording pen 16, at the receiver, is operated by a similar linkage mechanism which will be described later.

*Ink supply system for recording pen 16*

(Figures 1, 4, 7, and 8)

In order to provide ink for the recording pen 16, an inkwell 20 (Figures 4 and 7) is provided adjacent the receiver platen 22. This inkwell 20 is supplied with ink through a capillary tube 24 which leads into an ink tank 26. The ink in this tank 26 is periodically replenished from a larger ink reservoir 28, positioned as shown in Figure 1, by means of a solenoid-operated pump, generally indicated at 32 in Figure 8. This pump includes a cylinder 34, extending from the bottom to the top of the reservoir 28, which has two or more inlet ports 36 near its lower end through which ink stored in the reservoir enters the cylinder 34. A piston 38 is slidably fitted within the cylinder 34 and is connected by a rod 42 to a solenoid 44 supported by a bracket 46, which is secured to the upper surface of the tank 28 by screws 48. A collar 52 is keyed to the rod 42 and is arranged to strike the upper surface of the ink reservoir 28 to limit the downward movement of the rod 42 and piston 38. A compression spring 54 surrounds the shaft 42 and is held in compression between the collar 52 and an upper portion of the supporting bracket 46. This spring returns the piston to its lower position when the solenoid 44 is de-energized.

An outlet port 56 near the bottom of the cylinder 34 is connected by tubing 58 to the smaller ink tank 26. An over-flow pipe 62 extends into the ink tank 26 and communicates with the reservoir 28 to control the level of ink in the tank 26.

In operation, when the solenoid 44 is energized, the rod 42 is pulled upwardly compressing the spring 54 and allowing ink from the reservoir 28 to enter the cylinder 34 through the inlet ports 36. When the solenoid 44 is de-energized, the spring 54 forces the piston 38 downwardly, closing the inlet ports 36 and forcing a small quantity of ink through the tube 58 into the tank 26. The displacement of the piston 38 is larger than the total volume of the tubing 58 so that a sufficient quantity of ink is pumped into the tube 58 each time the piston 38 is actuated to completely fill this tube and eject a small quantity of ink into the ink tank 26. As will be explained more fully later, this solenoid 44 is connected so as to be actuated automatically during the operation of the receiver and keeps the ink tank 26 continually filled to the level of the over-flow pipe 62.

The reservoir 28 may be constructed of any suitable material, for example of plastic which is preferably transparent so that the ink supply can be observed visually. This large reservoir of ink permits the receiver to operate for long periods of time without attention. The ink supply can be replenished conveniently as part of the regular servicing operation so that it is not ordinarily necessary for the user of the apparatus to replenish the ink supply.

*Pen driving system*

(Figures 2, 3, 4, 6, and 7)

A moving coil system is utilized to operate the recording pen 16. A steady magnetic field for operation of the moving coils is produced by a permanent bar magnet 63 (Figure 3) which extends cross-wise of the receiver near the rearward portion thereof. This magnet is connected at each end by soft iron pole pieces 64 and 64R supported by two upright frame members 66 and 68, which may be castings of non-magnetic metal. The magnetic circuit is completed through two vertically laminated core members 70 and 72 which surround the ends of pole pieces 64 and 64R and are connected at the bottom by a cylindrical cross bar 74 of soft iron. The core members 70 and 72 are secured to and supported by the frame members 66 and 68 by bolts 76.

An annular space 78 and 78R (Figure 4) is provided between the outer surface of the pole pieces 64 and 64R and each of the laminated core members 70 and 72 along which the pen-operating coils 80 and 80R move; these coils are referred to, respectively, as left and right "buckets."

The current through the left bucket 80 is controlled in accordance with the position of the writing stylus 8 at the transmitter and assumes a position longitudinally along the space 78 in accordance with the magnitude of this current. In order to transmit the movement of the bucket 80 to the recording pen 16, the bucket winding is supported by an annular frame 82 which is connected to a yoke formed of two tapered channel members 84 and 86 (Figures 4 and 6). These channel members are connected to opposite sides of the frame 82 and extend outwardly through the annular opening 78. Beyond the end of the magnet 64, the channel members 84 and 86 are connected by two parallel, spaced, cross-members 88 and 90.

A ball-type chain 92 is secured to the center of cross-member 90 and extends around a peripheral groove 94 (see also Figure 2) in a cam 96 and is secured at its opposite end to a slotted end portion of a member 98 which is fastened in a recess in the cam 96 by a screw 102.

The cam 96 is rotatably mounted on a pen-operating drive shaft 104 and is coupled thereto by a coil spring 106, one end of which is secured to the surface of cam 96 by a forwardly-extending anchor pin 108, the other end of which is secured to a collar 112 that is keyed to the shaft 104. This spring tends to rotate the cam 96 relative to the shaft 104 in the direction indicated by the arrow in Figure 6.

The cross-member 90, at the point where the ball chain 92 is secured to it, rests in a notch 114 in the cam 96. Rotary movement of the cam 96 in the direction of the arrow (Figure 6) is limited when the outer wall of the notch 114 abuts the cross-member 90, the bucket and yoke assembly being in its innermost position. When the bucket 80 is energized with current of the correct polarity, the left bucket assembly moves toward the left as viewed in Figure 6, placing the ball chain 92 under tension and rotating the cam 96 in a direction opposite to that indicated by the arrow, this movement tending to wind up the spring 106. During the initial rotation of cam 96 the pen-operating drive shaft 104 remains stationary until the anchor pin 108 (Figure 10) which also extends outwardly from the rear face of the cam 96, strikes an arm 116, which is keyed to and extends radially from the shaft 104. Any further rotation of cam 96 exerts a corresponding rotary force on the shaft 104.

As best shown in Figure 2, the shaft 104 is rotatably mounted at its lower end in a bearing 117 supported by an arm 118 of a bracket 122, of non-magnetic material, secured to the end face of the bar magnet 64. This bracket 122 is provided also with a forwardly-extending arm 124 which supports a pivotal bearing 126 for the forward end of shaft 104.

A spiral spring 128 (best shown in Figure 7), which is substantially heavier than the spring 106, biases the shaft 104 for rotation in a clockwise direction as viewed in this figure. This spring is secured at its inner end to a collar 132 (Figure 2) which is fastened to the shaft 104 by a set screw 134, and at a point near its outer end to an L-shaped arm 136 which is supported by the bracket arm 124.

In order to link the shaft 104, with the pen 16, an arm 138, which is rigidly secured to and extends outwardly from the collar 132, engages the end of a flat spring member 142 which is hinged by a forked member 144 to a shorter flat spring member 146, whose widest dimension lies in a plane perpendicular to the widest dimension of the spring 142. The shorter spring member 146 is connected through the pen-linkage arm 150 and a pivotal joint 152 to the "right" pen linkage arm 150R that supports the pen 16, and which is linked to a second penactuating mechanism positioned on the opposite side of the receiving apparatus and which is generally similar in structure to the linkage mechanism just described, similar parts being referred to by similar numbers followed by the suffix "R" to indicate that they are corresponding right-hand members.

As shown in Figure 6, the right hand bucket assembly includes a right bucket winding 80R supported by a frame 82R which is connected to a ball chain 92R by a yoke arrangement substantially identical with that already described. It will be noted that in the normal resting position of the pen 16, that is with the pen positioned in the inkwell 20, that the left-hand bucket 80 is positioned at its innermost position, toward the center of the bar magnet 64, while the right-hand bucket 80R is positioned at its outermost position, near the outer end of the bar magnet 64.

The ball chain 92R is secured to the cam 96R, in the manner described above, but the cam 96R, on the right-hand side of the machine, is keyed directly to the pen-operating drive shaft 104R. The supporting structure for the shaft 104R and the spiral biasing spring 128R (Figures 2 and 7) are arranged in a manner substantially identical with that already described. The shaft 104R is connected to the pen 16 through a flat spring member 142R which is connected by a hinge to the shorter flat spring member 146R, which is, in turn, connected to the pen 16 through the rod 150R.

Fixed arms 154 and 154R are provided to limit the movement of the pen-supporting linkage so that when no signals are being received by the buckets 80 and 80R, the pen 16 will rest in inkwell 20. The arm 154 is secured to the bracket arm 124 and is provided with an over-hanging end portion 156 against which the spring member 142 abuts to limit the clockwise rotation of the shaft 104. On the right-hand side of the machine, the corresponding arm 154R is supported by the bracket arm 124R and limits the clockwise rotation of the shaft 104R.

Left-lever turn-on switch (Figures 2, 6, and 9)

The interconnecting lines are used for signaling and interlocking functions prior to the transmission of the message, and a switching mechanism at the receiver connects these lines for the transmission of the writing and pen-lifting signals during the transmission of the graphic message. Because the receiver is frequently unattended, the present structure provides an automatic switching arrangement whereby these lines are switched at the start of each message.

This switching function is accomplished by means of a "left-lever turn-on switch," generally indicated at 172 in Figure 6, which is actuated by the left bucket 80. The cross-member 88, which extends between two channel members 84 and 86, is positioned to strike the end of a switch-operating lever 174, pivotally mounted at 176, and upon rotation in a counter-clockwise direction to press a slidably mounted switch pin 178 inwardly of the switch 172 against the force of spring contact members 182 and 184 (see also Figure 9).

When the transmitter is not energized, so that no signal is being impressed on the bucket 80, the spring 106 forces the bucket 80 to its innermost position causing the cross arm 88 and lever 174 to actuate the switch 172 so as to connect the transmission lines between the transmitter and receiver for signaling and interlock purposes. In this embodiment, the automatic switching circuits are associated with the "right" line 364, and the left line remains in condition for receiving writing signals and actuating the left-lever turn-on switch.

When the transmitter, which is connected to the receiver through the "left" transmission line 344, is energized, and the writing stylus 8 is in the unison position, which is necessary to energize the writing circuits of the transmitter as described in the above-identified Lauder patent, a signal voltage is applied to the "left" bucket 80 which causes it to move outwardly a short distance. This movement of cross-arm 88 releases the lever 174 and permits the switch 172 to return to its normal position in which the "right" interconnecting line 364 is connected for the transmission of the writing signals.

This initial movement of the bucket 80 rotates the cam 96 against the force of the spring 106, but does not rotate shaft 104 because the portion of the anchor pin 108 extending from the rear of cam 96 is not in contact with the arm 116. Therefore, the bucket movement that transfers the receiver from signal-receiving to message-receiving condition does not move the recording pen 16 out of the inkwell 18. Any further outward movement of the bucket 80, after the pin 108 strikes the arm 116, produces a corresponding rotation of the pen-operating shaft 104. The electrical circuits associated with the left-lever turn-on switch will be described later.

Paper-shifting arrangement
(Figures 1 to 5 and 11)

The roll of paper 18, on which the messages are to be written by the recording pen 16, is mounted on a reel 188 which is rotatably supported by a shaft 192 the ends of which are supported by two upwardly-extending brackets 194 (Figure 2). Each of the brackets 194 (only one of which is shown in the drawings) is provided with an arcuate groove 196, having a bearing portion 198 adapted to receive one end of the shaft 192. This roll of supply paper may be inserted in the receiver by opening a hinged cover plate 202 in the case 6 (Figure 1) and swinging downwardly a pivotally mounted shield 204 (Figure 5) and sliding the end shaft 192 of the reel 188 downwardly along the arcuate grooves 196. The brackets 194 are provided with cut-out portions as shown at 205 in Figure 2 to permit passage of the pen-driving linkage members.

The paper strip 18 extends from the front of reel 188 upwardly over the upper surface of the writing platen 22 (Figure 5) between a friction drive roller 206 and a pressure roller 208, thence over an idler roller 212, and downwardly around a second idler roller 216 to a takeup reel 218.

The paper-handling mechanism is supported by the two upright frame members 66 and 68 which support the drive and idler rollers and the platen assembly. The pressure roller 208 is supported by a shaft 222 (Figure 4) which extends from each end of the roller 208 and is positioned in recesses 224 in the frame members 66 and 68 and is maintained at firm pressure against the surface of drive roller 206 by means of two tension springs 226 secured at one end to the shaft 222 and at their opposite ends to frame members 66 and 68, respectively.

The paper drive roller 206 (Figure 11) is driven by means of a sprocket 244 connected by a chain 246 to a lower sprocket 248 that is driven by an electric motor 252 through a worm drive assembly 254. The motor 254 is arranged also to rotate a switch-operating control cam 256 that operates a switch 258 to control the paper movement as will be described later.

A cam 262 (Figure 4) having a notch 264 is secured to the other end of the paper drive roller 206, adjacent which is positioned a follower-arm or a pawl 266 that is controlled by a solenoid 268. The pawl 266 is pivotally supported at 272 and is secured at its other end to an armature 274 of the solenoid 268. A shoulder 276 on the solenoid-controlled pawl 266 stops the rotation of the paper feed roller 206 at the position indicated, whenever the solenoid is not energized, the pawl being urged toward the locking position by a wire spring 278. A switch 282, forming part of the paper-shifting control circuits, is operated by the pawl 266. This switch, the solenoid 268, the switch 258, and the electric drive motor 252, are all connected into the paper-shifting circuit which will be described later.

The take-up reel 218 is driven by an electric motor 284 (shown only in the circuit diagrams in Figure 12), which is connected to operate simultaneously with the paper-shifter motor 252, and is provided with a friction drive clutch (not shown) which permits the take-up reel to keep the paper strip 18 under constant tension without overloading the motor 284 or tearing the paper. A manually operable switch 286 (Figure 1), extending from the top of the case 6 is provided so that the take-up reel can be driven separately from the paper-shifter motor when desired.

The writing circuits

As shown in Figure 12, the transmitter and local receiver are operated by alternating current from conventional supply lines 300 and 302. The line 300 of the A.-C. power mains is connected through an armature 304 and a fixed contact 306 of a unison relay, generally indicated at 308, to a transmitter power supply, indicated in block form at 312, which includes the usual transformers, rectifiers, and voltage regulator circuits, and which is connected directly to the supply line 302. The unison relay is controlled by a unison switch 314. This switch is positioned adjacent the transmitter platen 14 and is operated by pressing a control button (not shown) with the tip of the transmitter stylus 8. This switch is ratchet-controlled so that successive actuations of the control button alternately open and close the switch contacts. The switch is arranged so that it can be operated only by the stylus 8, substantially as described in connection with the unison switch in the above-mentioned Lauder et al. patent.

The negative output terminal 316 of the power supply 312 may be connected as indicated to a common ground circuit, which is used also as the return circuit between the local and distant stations.

The positive output terminal 318 of the power supply 312 is connected to the actuating winding 322 of a master relay, which controls a number of switches indicated at their respective places in the drawings as MS–1, MS–2, etc. During the time that graphic characters are being transmitted, that is, when the unison switch 314 is closed, this winding 322 is energized and accordingly the "MS" switches operated thereby are shown in the positions which they assume when this winding is energized.

The voltage from this power supply is applied also across "left" and "right" potentiometers, indicated at 324 and 326, respectively, the movable contacts 328 and 332 of which are controlled by the movement of the writing stylus 8. The stylus linkage mechanism of the transmitter and the potentiometers 324 and 326 are substantially as described in U. S. Patent 1,770,761 to Tiffany.

The movable contact 328 of the "left" potentiometer 324 is connected through a protecting fuse 334 and an isolation choke 336 to a fixed contact 338 on a switch MS–1, operated by the master relay winding 322, the armature 342 of which is connected to a transmission line 344 leading to the distant receiver, and which is called the "left" line.

The movable contact 332 of the "right" potentiometer 326 is connected through a protective fuse 346 and an isolating choke 348 to a fixed contact 352 of a switch MS–2, also operated by the master winding 322, the armature 354 of which is connected to a fixed contact 356 of a switch TS–1, which is operated by a transfer relay winding 358 that is energized whenever graphic characters are being transmitted or received; the energizing circuits for this transfer relay will be described later. The armature 362 of switch TS–1 is connected to the "right" line 364 which leads to the distant receiver.

Thus, when the graphic characters are being transmitted, the variable D.-C. voltages produced by the "left" and "right" stylus-controlled potentiometers 324 and 326 are connected directly to the "left" and "right" lines 344 and 364 for transmission to the distant receiver.

Because the "left" and "right" lines may be connected at the distant station to a transceiver identical with that represented by Figure 12, the action at the distant receiving end may be explained by assuming that signals are being received locally on the "left" and "right" lines and that all of the various switches have been changed to the receiving position, as will be described later.

During transmission, the local receiver is utilized as a monitor so that the operator can see the characters on the local receiver exactly as they are being reproduced at the distant station. Thus, the signal from the stylus-controlled contact 328 of the "left" potentiometer 324 is connected also from the "left" line 344 through a resistor 366, which may have a value of 1200 ohms, a lead 368, and an isolation choke 372 to one terminal of the "left" bucket 80 of the local receiver. The other terminal of this bucket is connected to the common ground circuit.

The signal from the "right" stylus-controlled potentiometer contact 332 is connected through a resistor 374, having a value equal to the resistor 366 in the other side of the line, and an isolation choke 376, to one terminal of the "right" bucket 80R of the local receiver. The other terminal of this bucket is connected to the common ground circuit. Thus, the stylus-generated voltages are applied also to the two buckets of the local receiver and control the movement of the recording pen 16, as described above.

*Receiver power supply and unison relay circuit*

This power supply 382 also delivers a smooth D.-C. voltage to a second positive output terminal 408 which provides power for the unison relay, the transfer relay, the signaling circuits, the pen-lifter circuits, and for controlling the paper-shifter circuits in the receiver. Thus, the secondary winding of the transformer 398 is connected to a second full-wave rectifier system, generally indicated at 412, the output voltage of which is filtered by a shunt condenser 416, connected to the positive terminal of the rectifier system through a current limiting resistor 414.

The unison relay 308, which turns the transmitter "on" and "off," is controlled by the unison switch 314. The operating circuit for this relay can be traced from the positive terminal 408 of the receiver power supply 382, through the switch 314, the energizing winding 417 of the unison relay 308, and a current-limiting resistor 419 to ground. As explained above, this unison switch 314 is positioned so that it is operated by the stylus 8 and is controlled by a ratchet mechanism so that the switch is maintained in either "on" or "off" positions. That is, when pressure is exerted on the control button unison switch by means of the writing stylus to turn the transmitter "on," the transmitter remains "on" until the unison control button is again depressed, after which the transmitter remains "off" until the switch is again actuated.

*The paper-shifter circuits*

The paper-shifter operates automatically each time the transmitter is turned off and moves the paper strip 18 a predetermined distance, usually one frame. When writing signals are applied to the receiver circuit, either from the local transmitter or from a remote transmitter, the left-lever turn-on switch is operated and closes the switch LT–2, completing a circuit from the positive terminal 408 of the receiver power supply 382 through a fixed resistor 502, the paper-shifter relay winding 388, and the fixed contact 504 and movable arm 182 of the switch LT–2 to ground. A movable armature 506 is engaged with a fixed contact 508 of a switch PS–2 by this energization of the paper-shifter winding 388 to complete a circuit from the alternating current supply line 300 through arm 506 and contact 508 of the switch PS–2, an energizing winding 512 of a second paper-shifter relay, which controls switches PL–1 and PL–2, a fixed contact 514 and movable arm 516 of the cam-operated microswitch 258 to the other A.-C. supply line 302. The contacts of the microswitch 258 at this time are held in closed position by the cam 256. Once the second paper-shifter relay winding is energized, energization is maintained by a holding circuit that can be traced from the A.-C. line 300 through a movable armature 518 and fixed contact 522 of the switch PL–1 of the second paper shifter relay, the energizing coil 512 of this relay and the cam-operated micro-switch 258 to the other A.-C. line 302.

Accordingly, when writing signals are applied to the receiver, the two paper shifter relays are energized and remain in this condition so long as the receiver is receiving writing signals. However, when the transmitter is de-energized so that no writing signals are being received, the left-lever turn-on switch returns to its normal position, and the first paper-shifter relay winding 388 is de-energized because the switch LT-2 is now open, but the second paper-shifter relay winding 512 remains energized through its own holding circuit described above. With the first paper shifter relay winding 388 de-energized and the second paper-shifter relay winding 512 energized, a paper-shifting circuit is completed that can be traced from the A.-C. line 300 through the movable armature 506 and a fixed contact 524 of the switch PS-2 of the first paper shifter relay, a movable armature 526 and a fixed contact 528 of the second paper-shifter relay, the paper shifter solenoid 268 (also shown in Figure 4) to the other A.-C. line 302. Accordingly, each time the transmitter is de-energized, the paper-shifter solenoid 268 is energized. The paper shifter solenoid plunger is mechanically linked to a follower in the form of the pawl 266 which rides on the paper roller cam 262. The pawl 266 is arranged to actuate mechanically a movable arm 532 of the switch 282, the arm 532 is adapted to engage a contact 534 when the solenoid 268 is energized or when the pawl 266 is unable to drop into the notch 264 on the cam 262. Thus, when the paper-shifter solenoid 268 is energized, a circuit is completed from the A.-C. line 300 through the movable arm 532 and the fixed contact 534, the paper-shifter motor 252 to the other A.-C. line 302. The paper-shifter motor then drives the paper drive-roller 206 to move the paper strip 18 through the receiver. This motor 252 also drives the cam 256 to control the operation of the microswitch 258, which is in the holding circuit of the second paper-shifting relay. When this gear cam 256 reaches the position where the microswitch follower arm is on the flat of the cam, the switch 258 opens and the winding 512 of the second paper-shifter relay is deenergized. De-energization of the latter winding opens the circuit between the fixed contact 528 and the movable armature 526 of the second paper-shifter relay switch PL-2 and de-energizes the paper-shifter solenoid 268. The solenoid plunger, however, is restrained from returning to its normal "off" position by the pawl 266 which at this time, is riding on the high part of the paper roller cam 262. The switch contacts 532 and 534, of the switch 282, therefore, remain closed and the paper-shifter motor continues to operate, rotating the paper drive roller 206 until the pawl 266 drops into the notch 264 in the cam 262, releasing the solenoid plunger and opening the switch 282, which disconnects the paper-shifter motor 252 from the A.-C. lines. The driving arrangement is such that at the time the paper-shifter motor 252 is de-energized, the cam 256 has rotated to a position closing the contacts of the cam-operated switch 258. This paper-shifting cycle is repeated automatically each time the local or distant transmitter, whichever is connected to the local receiver, is turned off.

In order to wind up the paper that is moved through the receiver by the drive roller 206, which is operated by the paper-shifter motor 252, the winder motor 284, which is connected to the take-up reel 218, is normally connected in parallel with the paper-shifter motor 252, so that the winder motor operates each time the shifter motor is energized. The manually operable push-button switch 286 is provided by which the winder motor can be energized without energizing the operation of the paper-shifter motor 252, for example, to take-up slack in the paper strip 18 when the machine is being loaded or when the paper has been pulled back for reference.

The ink-pump solenoid 44 is connected in parallel with the paper-shifter solenoid 268 so that a fresh supply of ink is pumped from reservoir 28 to the tank 26 each time the paper-shifting circuits are energized.

From the foregoing, it will be observed that the telescriber embodying the invention is well adapted for the attainment of the ends and objects hereinbefore set forth and to be economically manufactured, the separate features being readily suited to common production methods. It is apparent that the various features may be modified in order to adapt the telescriber to particular use and that one or more of the features may be used without a corresponding use of other features, and the foregoing example is given for the purpose of illustrating a preferred embodiment of the invention and not for purposes of limitation except as set forth in the following claims or required by the prior art.

What is claimed is:

1. In a telescriber system in which graphic characters traced by a stylus at a transmitter are simultaneously reproduced at a receiver, apparatus comprising a transmission channel to transmit writing signals between said transmitter and said receiver, a recording pen, driving means responsive to said writing signals for moving said pen, recording paper, means for moving said paper in predetermined increments through said receiver, an ink reservoir, an ink-supply tank having a capacity substantially less than said reservoir and located above said reservoir, means connected with said supply tank for feeding ink to said pen, overflow vent means connected between said ink supply tank and said reservoir for controlling the level of ink in said tank, an ink pump arranged to pump ink from said reservoir to said supply tank, cyclic means for operating said pump, and circuit means for actuating said cyclic means as a function of the movement of said paper through said receiver.

2. In a telescriber system in which graphic characters traced by a stylus at a transmitting station are simultaneously reproduced at a receiving station, apparatus comprising a transmission circuit to transmit writing signals from said transmitter to said receiver, a recording pen, a driving mechanism responsive to said writing signals for moving said pen, a recording paper tape, means for shifting said paper tape in predetermined increments through said receiver, an ink reservoir, an ink-supply tank having a capacity substantially less than said reservoir, tubing having a capillary therethrough connected with said supply tank for feeding ink to said pen, a solenoid-operated ink pump communicating with said reservoir, ink-supply tubing connecting said pump with said supply tank and arranged to carry ink thereto from said pump, cyclic means for energizing said solenoid, and circuit means for actuating said cyclic means said circuit means being under the control of said driving mechanism.

3. In a telescriber system in which graphic written characters traced by a transmitter stylus at a transmitter station are simultaneously reproduced at a receiver station, apparatus comprising a transmission channel to transmit writing signals between said transmitter and said receiver, a recording pen, driving means responsive to said writing signals for moving said pen, recording paper tape, a paper-shifter mechanism for moving said paper tape in predetermined increments through said receiver, an ink reservoir, an ink-supply tank having a capacity substantially less than said reservoir, means connected with said supply tank for feeding ink to said pen, a solenoid-operated ink pump communicating with said reservoir and arranged to pump ink from said reservoir to said supply tank, tubing connecting said pump with said supply tank and arranged to carry ink thereto from said pump, and a paper-shifter mechanism control means, said control means and said ink pump being responsive to the interruption of writing signals in said channel.

4. In a telescriber system in which graphic characters traced by a stylus at a transmitter are simultaneously reproduced at a receiver, apparatus comprising a transmission channel to transmit writing signals between said transmitter and said receiver, a recording pen, pen driving means connected to said channel responsive to said writing signals for moving said pen, recording paper, means for moving said paper in predetermined increments through said receiver, an ink reservoir, an ink supply tank, a tube having a capillary connected with said supply tank for feeding ink to said pen, an ink pump communicating with said reservoir, said pump including a solenoid, a cylinder, and a movable piston mounted for reciprocating movement therein, said piston being operably connected to said solenoid, said cylinder being located within and communicating with said reservoir, cyclic means for energizing said solenoid to operate said pump, and circuit means under the control of said pen driving means for actuating said cyclic means.

5. In a telescriber system in which graphic characters traced by a stylus at a transmitter are simultaneously reproduced at a receiver, apparatus comprising a transmission channel to transmit writing signals between said transmitter and said receiver, a recording pen, recording paper, driving means responsive to said writing signals for moving said pen on the surface of said paper, an ink reservoir, an ink-supply tank having a capacity substantially less than said reservoir, means connected with said supply tank for feeding ink to said pen, an ink pump arranged to pump ink from said reservoir to said supply tank, switch means connected to said channel and responsive to the absence of writing signals on said channel, and an ink pump drive mechanism under the control of said switch means and arranged to actuate said pump when said writing signals are interrupted.

6. In a telescriber system in which written symbols traced by a stylus at a local transmitter are simultaneously reproduced at a distant receiver, apparatus comprising transmission wires to transmit writing signals between said transmitter and said receiver, a recording pen and movable linkage for same, pen-linkage drive mechanism responsive to said writing signals for moving said pen, a recording paper strip, a paper-shifter mechanism for moving said paper in predetermined increments through said receiver, an ink reservoir having at least one transparent wall whereby the level of ink therein can be viewed therethrough, an ink supply tank having a capacity substantially less than said reservoir, an inkwell for said pin, a feed tube connected from said tank to said inkwell and having a capillary for feeding ink to said inkwell, an ink pump arranged to pump ink from said reservoir to said supply tank, an ink-pump solenoid motor, said pump including a cylinder and a movable piston located therein and mechanically connected to said solenoid motor, said cylinder being located within said reservoir and communicating therewith, a supply pipe connecting said pump to said supply tank for conveying ink from said pump to said tank, and a control means responsive to the interruption of writing signals in said channel and connected to said paper-shifter mechanism and said solenoid motor for controlling the operation of said paper-shifter mechanism and said ink pump.

7. In a telescriber system in which graphic characters are traced by a manually movable stylus and a stylus-position sensing means is arranged to sense the location of said stylus and to generate electrical writing signals corresponding with said stylus position which are transmitted by transmission lines to receiver apparatus which includes a paper tape, a paper shifter mechanism for shifting said tape by predetermined increments through said receiving apparatus, a recording mechanism connected to said lines and having a movable pen and being responsive to said writing signals to move said pen over portions of said paper tape to reproduce graphic characters thereupon, the receiver apparatus comprising, a receiver ink-supply reservoir having walls of transparent material whereby the level of the ink therein can be viewed therethrough, an ink pump mechanism having a solenoid motor, a cylinder, and a piston movably mounted within said cylinder, said cylinder being mounted within said reservoir and having intake ports whereby ink can pass from said reservoir into said cylinder, said cylinder also having an outlet port, a biasing spring mechanically connected to said piston, a mechanical linkage between said piston and said motor whereby energization of said solenoid motor moves said piston against the action of said spring and so as to open said intake ports whereby ink flows from said reservoir into said cylinder through said ports, said biasing spring acting to move said piston upon de-energization of said motor in a direction so as to close said intake ports and to force the ink entrapped within said cylinder through said outlet port, an ink-supply tank having a capacity substantially less than said reservoir and located with respect to said reservoir so that its entire interior is higher than said reservoir, a supply tube connecting the outlet port of said pump to said supply tank for conveying ink to said tank upon de-energization of said solenoid, an overflow vent in said supply tank for an overflow tube connecting said vent to the reservoir for conveying excess ink from said supply tank back to said reservoir to control the maximum level of ink therein, an inkwell associated with said recording mechanism for inking said pen, an inkwell-supply tube having a capillary and connected from said supply tank to said inkwell for feeding ink thereto from said tank, the displacement of the piston within said cylinder being sufficient to more than completely fill said supply tube by one stroke, and a solenoid-energizing and control means responsive to the absence of writing signals on said transmission lines to energize said solenoid, time delay release means responsive to the energization of said solenoid for de-energizing said solenoid, thereby forcing ink from said cylinder into said supply tank.

8. Data recording apparatus for tracing graphic characters and the like and having an ink supply system adapted for long and continuous unattended operation without the need of frequent periodic inspection and servicing, comprising, in combination, a source of intelligence signals to be recorded, a sheet of recording paper, a movable pen positionable on the surface of said paper, a driving mechanism responsive to said intelligence signals and operable to move said pen over said paper in conformance therewith, an ink reservoir, an ink supply tank having a capacity substantially less than said reservoir and located above said reservoir, means for feeding ink from said supply tank to said pen, an ink pump communicating with said reservoir, ink supply tubing connecting said pump with said supply tank and arranged to carry ink thereto from said pump, overflow vent means connected between said ink supply tank and said reservoir for controlling the level of ink in said tank, and an activating element for intermittently energizing said ink pump, whereby the ink in said supply tank is intermittently agitated and freshened by recirculation of ink between said tank and said reservoir.

9. Data recording apparatus for tracing graphic characters and the like and having an ink supply system adapted for long and continuous unattended operation without the need of frequent periodic inspection and servicing, comprising, in combination, a source of intelligence signals to be recorded, a sheet of recording paper, a movable pen positionable on the surface of said paper, a driving mechanism responsive to said intelligence signals and operable to move said pen over said paper in conformance therewith, an ink reservoir, an ink supply tank having a capacity substantially less than said reservoir and located above said reservoir, means for feeding ink from said supply tank to said pen, an ink pump arranged to pump ink from said reservoir to said supply tank, an ink-pump solenoid motor, said pump including a cylinder and a movable piston located therein, said piston being under the control of said solenoid motor for movement into first and second positions, said cylinder being within said reservoir, an intake port in the wall of said cylinder, said intake port being located below the level of ink in said reservoir, ink supply tubing connecting said pump with said supply tank, said ink pump being arranged to allow ink to flow through said intake port when said piston is in said first position and to seal off said intake port and to pump ink through said tubing to said supply tank when said piston moves to said second position, overflow vent means connected between said ink supply tank and said reservoir for controlling the level of ink in said tank, and circuit means for intermittently energizing said solenoid motor, whereby the ink in said supply tank is intermittently agitated and freshened by recirculation of ink between said tank and said reservoir.

References Cited in the file of this patent

UNITED STATES PATENTS

| | | |
|---|---|---|
| 1,335,125 | Miller | Mar. 30, 1920 |
| 2,157,549 | Lindenblad | May 9, 1939 |
| 2,308,710 | Nicholas | Jan. 19, 1943 |
| 2,355,087 | Lauder et al. | Aug. 8, 1944 |